Nov. 15, 1960 H. B. ALBERS ET AL 2,960,221
EXTRUSION PRESS FOR ELONGATED CROSS-SECTIONS
Filed April 12, 1954 4 Sheets-Sheet 2

United States Patent Office 2,960,221
Patented Nov. 15, 1960

2,960,221

EXTRUSION PRESS FOR ELONGATED CROSS-SECTIONS

Heinrich B. Albers, Malverne, Gerhard P. Krause, Harrison, Frederick T. Morrison, Forest Hills, and George Gerard, Yonkers, N.Y., assignors, by mesne assignments, to Baldwin-Lima-Hamilton Corporation, Philadelphia, Pa., a corporation of Pennsylvania Filed Apr. 12, 1954, Ser. No. 422,318

6 Claims. (Cl. 207—2)

This invention relates to an extrusion press which comprises a container adapted to hold a billet of the material to be extruded, the container being positioned adjacent a die through which the material is extruded by means of an extrusion plunger or stem which enters the container under high pressure. More particularly, this invention relates to means for extruding large shapes of elongated cross-section from light metals, ferrous metals, and the like. The problem which is thus presented arises from the fact that containers normally are formed with chambers of circular cross-section, whereas it is of great advantage to match the billet shape to the extruded shape. Such matching of shapes results in maintaining substantially uniform extrusion ratios of metal in the container relative to the die opening along the circumference of the die opening, and this will result in substantially uniform strength properties in the extruded material due to the uniform working of the material at all points. The matching of the billet shape to the extruded shape would also result in wider shapes being obtained from a billet of a certain weight and cross-sectional area than would be possible to obtain from a round billet of the same weight and cross-sectional area. This would in turn allow the extrusion of wider shapes on a press of given size, or conversely, will reduce the press capacity required for extruding a given shape, while maintaining the same unit pressure on the material to be extruded.

A container having a chamber of elongated shape will be subjected to large loads in the region of the longer sides of the opening so that the container will tend to bulge outwardly in the direction of such forces. This sets up large bending stresses in the regions of the narrow ends of the elongated chamber causing large deformation and possible failure of the container. In addition, it may be noted that it is extremely difficult to manufacture a container having such an elongated cross-sectional chamber, the machining, in particular, presenting a major problem.

It is therefore one of the principal objects of this invention to provide a container which will have a chamber of non-circular cross-sectional shape for accommodating billets of elongated cross-section which will be similar in shape to the extruded shape, without presenting the difficulties in manufacture and inherent danger of failure of the container heretofore experienced.

Further objects and advantages of this invention will become apparent in the following detailed description thereof.

In the accompanying drawings.

Figure 1:
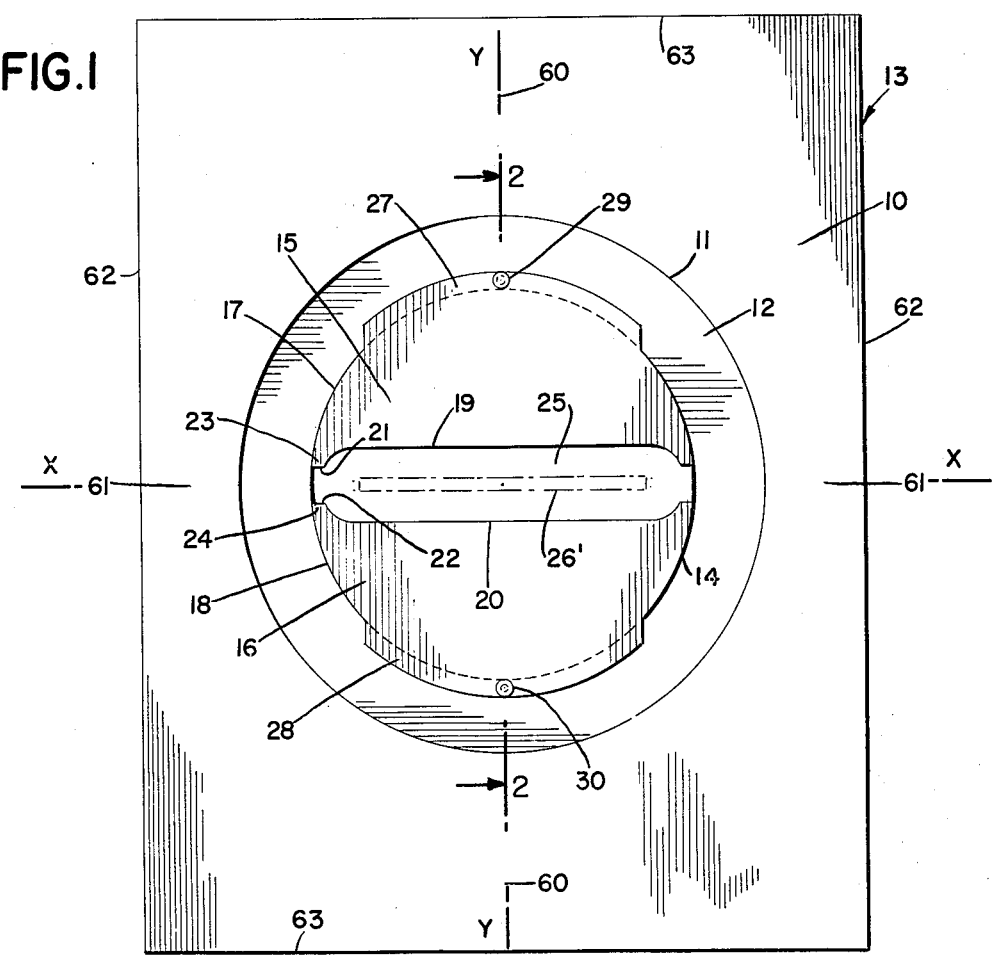
Fig. 1 is an end view of a container embodying one form of this invention.
Figure 2:
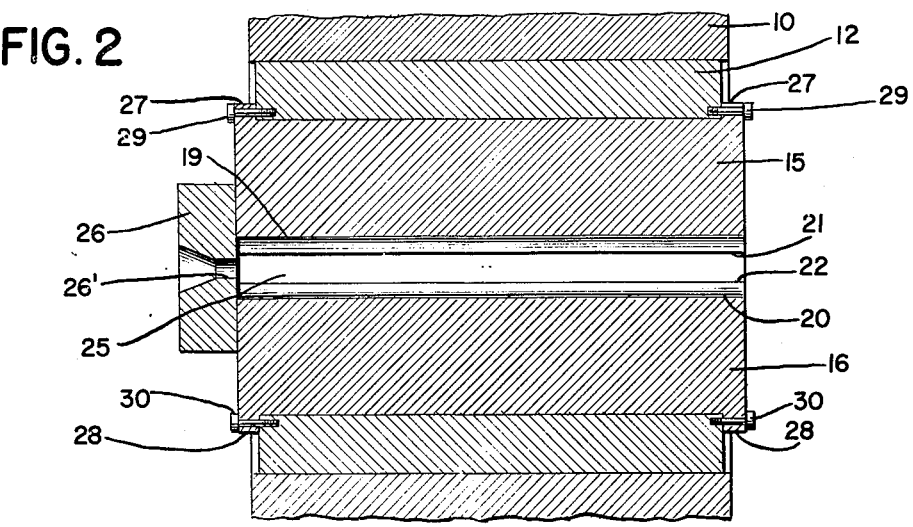
Fig. 2 is a section taken on the line 2—2 of Fig. 1 on reduced scale.

Referring to Fig. 1 of the drawings, there is shown a container generally indicated at 13 and having a conventional cylindrical bore 14 therethrough. Such bore is easily machined so that no manufacturing problems are created thereby. As shown, the container 13 preferably comprises a casing 10 and a sleeve or liner 12 in which the bore 14 is formed. The liner 12 is mounted in an opening 11 of the casing and serves for actually receiving the material, which prevents the casing from being unduly worn, as is well known in the art. As used herein, the term "container" may include a casing with or without a liner. The inventive problem is here solved by taking advantage of standard manufacturing procedure in producing a container with cylindrical bore, and then making provision for receiving billets of elongated cross-sectional shape corresponding to the shape of the desired extrusions. This is achieved in one form by providing for insertion into the cylindrical bore 14 of the container 13 of a pair of opposite inserts 15 and 16 whose outer surfaces are cylindrical as shown at 17 and 18, but which are provided with cooperating surfaces 19 and 20 so formed that together they outline a cross-sectional area of any desired non-circular shape, in this instance, a substantially oblong cavity or chamber 25 oriented along a major axis X—X and a minor axis Y—Y. When mounted in the container, the inserts 15 and 16 are permanently spaced apart in the direction of the shorter dimension or minor axis Y—Y of the chamber 25 for a purpose described later. The surfaces 19 and 20 may terminate in surfaces 21 and 22 closer together than the surfaces 19 and 20 in order to form marginal projections or sealing lips 23 and 24. It will now be seen that the elongated chamber 25 can receive a billet having an elongated cross-sectional shape similar to the shape of chamber 25 which in turn is similar to the shape of an extrusion leaving the die 26 through opening 26'. With the center portion of inserts 15, 16 having their largest mass at the center, the center resists pressure more than the outside portions. The latter will, therefore, yield more to pressure and will thus effect distribution of stress radially over a larger area.

The inserts 15 and 16 may be provided with end flanges 27 and 28 and may be fastened to the container by any suitable fastening means 29, 30. Since during assembly the inserts may be brought together or introduced separately into the container, it is possible to provide flanges at both ends of the inserts, and after being moved into position in the container, they may be spread apart to cause the flanges and opposite ends to engage the opposite ends of the container.

Examining the structure of Fig. 1 just described, it will be apparent that there has been created a non-circular billet holding chamber in the container without resorting to the necessity of difficult machining operations to machine such a chamber in the container proper or liner. It will further be seen that the two inserts, being independent, will follow the distortion of the container caused by the greater load developed by pressure along the longer surfaces of the chamber and will not be subject to bending stresses adjacent the narrow ends of the chamber 25.

Figure 3:
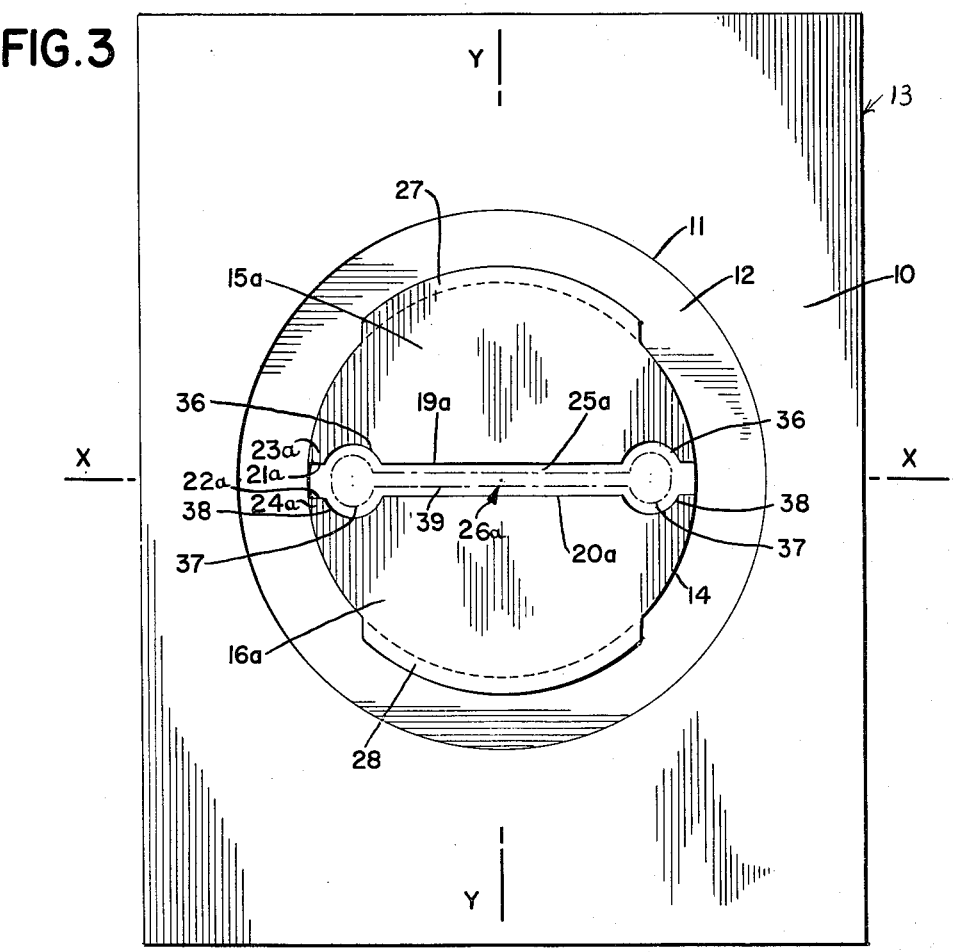
Fig. 3 is an end view of a container embodying another form of this invention.

As disclosed in Fig. 3, the inserts 15a, 16a may be varied to provide a chamber 25a of any desired shape corresponding to the shape of the part to be extruded. Thus, surfaces 36, 38 cooperating with wide portions 37 of the die opening generally indicated at 26a are spaced at a relatively great distance, whereas surfaces 19a, 20a cooperating with a narrow portion 39 of the die opening are spaced at a smaller distance. The surfaces 21a, 22a and sealing lips 23a, 24a serve for the same purpose as the corresponding surfaces and sealing lips of Fig. 1.

Figure 4:
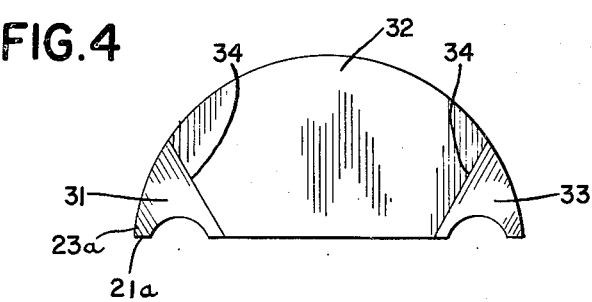
Fig. 4 is a view largely diagrammatic of a modified form of insert.

In a modification of the insert structure disclosed in Fig. 4, each insert may comprise a plurality of sections 31, 32, 33, the meeting edges 34 between the central section 32 and the end sections 31 and 33 being inclined so as to form a wedge tending to force the end sections 31 and 33 outwardly against the container bore 14 under pressure of the metal in the chamber 25a. As a result of such outward movement of the end sections, they will be pressed more firmly against the container bore to effect more adequate sealing between the inserts and the container bore. Each of the sections 31, 33 has a surface 21a and a sealing lip 23a which correspond to those shown in Fig. 3.

Figure 5:
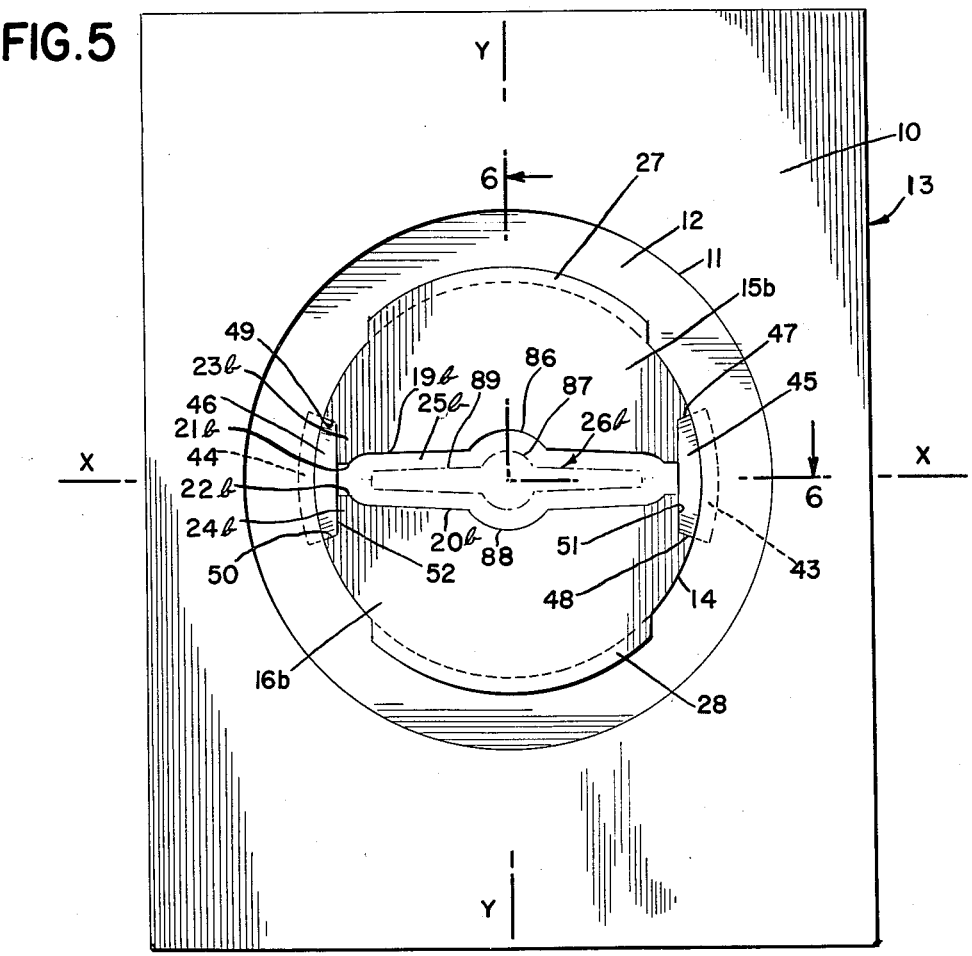
Fig. 5 is a view similar to Figs. 1 and 3, showing another form of this invention.
Figure 6:
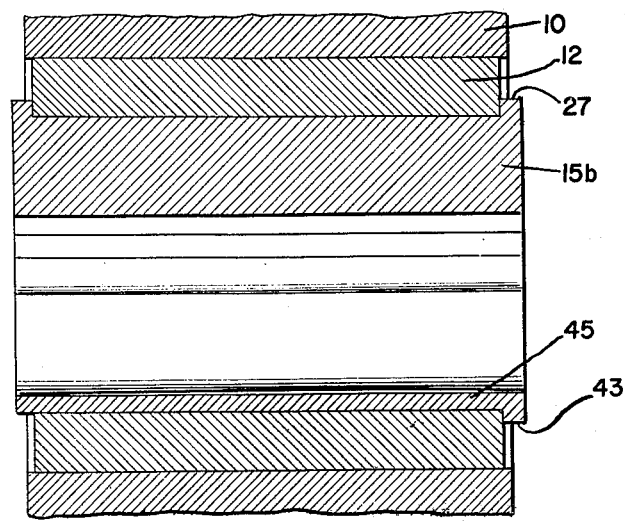
Fig. 6 is a section taken on the line 6—6 of Fig. 5 on reduced scale.

In another form of this invention, disclosed in Figs. 5 and 6, there may be employed in addition to principal inserts 15b and 16b similar to those disclosed in Fig. 1, auxiliary end inserts 45 and 46. The principal inserts are permanently spaced apart in the direction of the minor axis Y—Y and the auxiliary end inserts are permanently spaced apart in the direction of the major axis X—X, for a purpose described later. Such end inserts perform a variety of functions with resulting advantages. Thus each end insert is provided with upper and lower, substantially radially disposed bearing surfaces 47, 49 and 48, 50 which serve to support the spaced inserts 15b, 16b in spaced relation. Said end inserts 45, 46 are also provided with end flanges 43, 44 engaging one end of the casing or liner, and with additional bearing surfaces 51, 52 which are engaged by the lips of inserts 15b, 16b to effect sealing of the chamber 25b. As a result of this construction, it is possible to shrink the liner 12 upon the inserts 15b, 16b, 45, 46, since the inserts 15b and 16b now have members (45 and 46) against which they can press. Furthermore, any loads developed adjacent the ends of chamber 25b act upon the end inserts 45 and 46 which then distribute such loads over a relatively large predetermined area of the container bore 14. In this form of the invention, the chamber 25b has an enlarged center portion formed by surfaces 86, 88 to cooperate with a similar enlarged portion 87 of the die opening generally indicated at 26b. The lateral portions of chamber 25b are formed by tapering surfaces 19b, 20b to cooperate with similar tapering portions 89 of the die opening.

Figure 7:
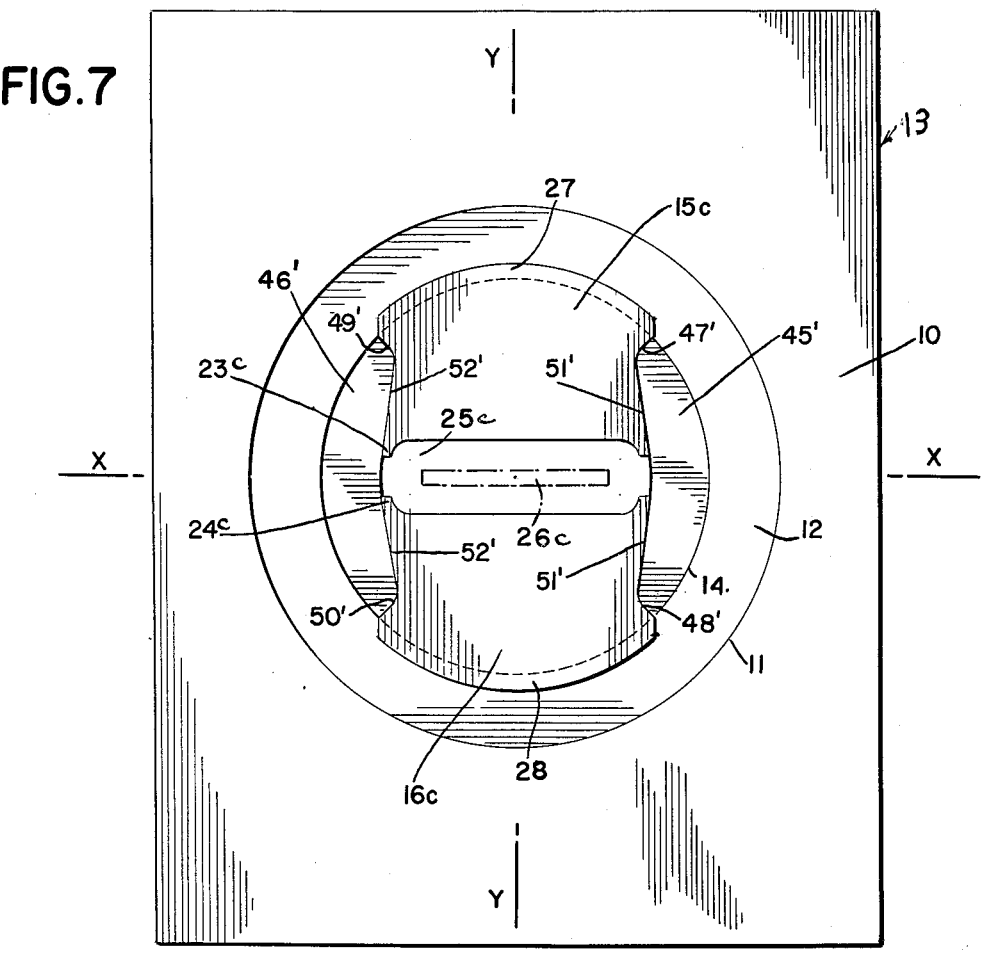
Fig. 7 is a view similar to Fig. 5 showing still another form of this invention.

As disclosed in Fig. 7, the inner or additional bearing surfaces 51' and 52' of the auxiliary inserts 45' and 46' may be inclined in opposite directions above and below the central axis of the chamber 25c so as to form cooperating wedges which narrow outwardly toward the circumference of the bore 14. Thus, the inside of each of the auxiliary inserts 45', 46' has an approximately V-shaped recess, the vertex of which is preferably slightly rounded. The inclined surfaces 51', 52' engage the principal inserts 15c, 16c and terminate at bearing surfaces 47', 48', 49', 50'. As shown in Fig. 7, the inclined surfaces and bearing surfaces may be slightly rounded where they meet. Each of the bearing surfaces 47' to 50' extends outwardly from the V-shaped recess and terminates at the adjacent end of the bore-contacting surface of the respective auxiliary insert 45' or 46'. As in the preceding embodiment, the bearing surfaces support the principal inserts in spaced relation. By this construction, the outward movement of principal inserts 15c and 16c will cause the auxiliary inserts 45' and 46' to be pressed more firmly against the periphery of the bore and thus more adequately distribute the stresses. The inclined surfaces 51' and 52' will also provide better sealing of the lips 23c and 24c of the principal inserts. Such inclination of surfaces 51' and 52' will permit larger areas of the auxiliary inserts 45' and 46' to engage the wall of the container bore 14 and thus further assist in the distribution of stresses. The die opening 26c is of the type shown in Fig. 1.

Figure 8:
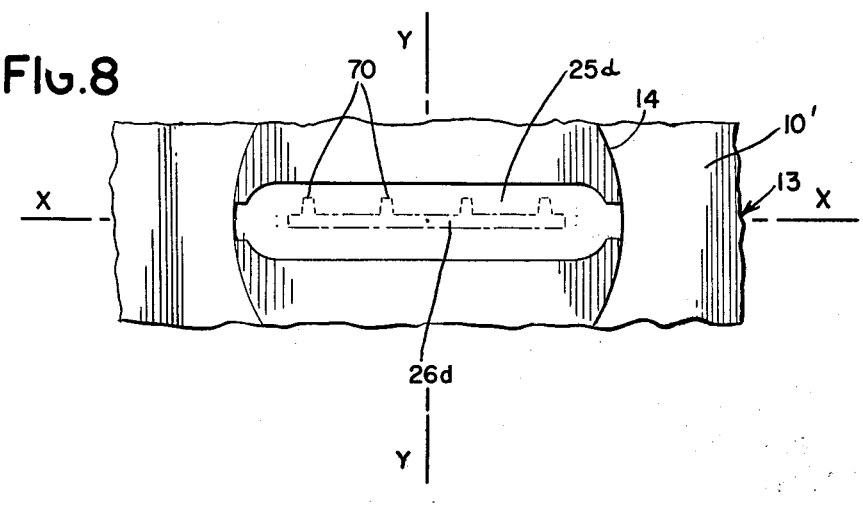
Fig. 8 is a view, largely diagrammatic, showing the relation of a chamber opening to a modified form of die opening.

Referring to Fig. 8, it will be seen that as long as the ratio of the main dimensions of the chamber 25d is substantially the same as the ratio of the main dimensions of die opening 26d, the presence of minor variations in contour, such as extrusions 70 in the form of ribs, will not materially affect the herein described flow of metal. Further, this modification illustrates a casing 10' consisting of one integral piece without a liner therein.

It will be seen from the drawings that in all the embodiments, opposite inserts are spaced from each other. Thus, there is no contact between the inserts 15, 16 in Fig. 1; 15a, 16a in Fig. 3; 15b, 16b in Fig. 5; and 15c, 16c in Fig. 7. Likewise the auxiliary inserts 45, 46 in Fig. 5, and 45', 46' in Fig. 7 do not engage each other. Therefore, when opposite inserts tend to move apart, no leakage gap will be formed therebetween, the outer edges of the inserts being urged against the wall of the cylindrical bore of the container, or in the case where there are both principal and auxiliary inserts, the edges of the principal inserts are urged against the auxiliary inserts. This assists in sealing the billet chamber and, at the same time, in transmitting the extrusion pressures evenly to the outer chamber so that failure of the parts will be avoided. As no leakage gaps are formed, the internal area of the chamber subject to pressure will remain substantially constant when pressure developed within the chamber urges inserts outwardly in the direction of the shorter dimension or minor axis of the chamber. Any detrimental increase in bursting force which depends upon the internal area and the pressure acting thereon is thus avoided.

Referring now to the outer shape of the container 10, it should normally be expected that a cylindrical shape will result in best stress distribution. Photoelastic tests, however, have shown that in round containers encasing an elongated chamber such as chamber 25, considerable stress concentrations occur adjacent the shorter surfaces of the chamber.

In this connection, it should be noted that the long surfaces of chamber 25, due to their relatively large areas, will necessarily be subjected to loads greater than those applied to the short surfaces. Since all these loads will be transmitted to the container 10, the portions of the container which are indicated at 60 in Fig. 1 and are positioned adjacent the long surfaces of chamber 25 will tend to bulge outwardly and bend around the portions indicated at 61 so as to cause stress concentrations at the latter points. It should also be noted that the wall portions 61, which are intersected by the major axis X—X of the billet-receiving cavity 25, are subject to the greatest tensile or bursting force while the wall portions 60, which are intersected by the minor axis Y—Y of the cavity 25, are subject to a smaller tensile force.

According to this invention, the above stress concentrations are minimized by making the cross-section of the container longer in the direction at right angles to the greater dimension of the billet chamber than in the direction at right angles to the shorter dimension of the chamber. In this way, portions 60 of the container in the region of the minor axis and smaller tensile force have a greater wall thickness than portions 61 in the region of the major axis where the thickness is dimensioned at least to sustain said greatest tensile force, as clearly shown in the drawings. This provides for greater stiffness of the container at the portions 60 and for greater flexibility at the portions 61, which results in a more uniform distribution of the stresses and will minimize bending stresses in the wall portions 61, i.e., in the region of the major axis. At the same time, the reduction in one of the outer dimensions of the container decreases the space required for the container in the press so that larger shapes may be extruded within an arrangement of a certain size.

In the embodiment shown, the container is of rectangular shape having longer sides 62 and shorter sides 63 but any other suitable outer shape may be used, in which the wall thickness is greater in the portions 60 than in the portions 61.

Having described our invention, what we claim and desire to secure by Letters Patent is:

1. In a metal extrusion press, a die having an opening of a contour substantially elongated transversely to the direction of extrusion, a container cooperating with said die and having a circular bore therethrough, and means forming in said circular bore a chamber of predetermined internal area and of substantially elongated cross-sectional contour generally similar to said contour of the die opening for receiving a billet of corresponding elongated cross-section, said means comprising a pair of opposite insert means in said circular bore, each of said insert means having a surface for engaging said billet and a circumferential surface conforming to the surface of said circular bore, said opposite insert means being permanently spaced from each other in the direction of the shorter dimension of said elongated contour of the chamber, whereby, when pressure developed within the chamber forces the insert means outwardly in the direction of said shorter dimension, the internal area of the chamber subject to said pressure will remain substantially constant.

2. In a metal extrusion press, a container having a circular bore therethrough, and means forming in said circular bore a chamber of elongated cross-sectional contour having a major axis and a minor axis for receiving a billet of corresponding elongated cross-section, said means comprising a pair of opposite principal inserts positioned in said circular bore, each of said principal inserts having a billet-engaging surface substantially parallel to said major axis, and a pair of opposite auxiliary inserts positioned in said circular bore intermediate said principal inserts at opposite sides thereof and supporting said principal inserts, each of said auxiliary inserts having a billet-engaging surface extending transversely of said major axis, the principal inserts being permanently spaced in the direction of said minor axis and the auxiliary inserts being permanently spaced in the direction of said major axis.

3. A metal extrusion press as specified in claim 2, in which the principal inserts have a plurality of contact surfaces engaging the respective auxiliary inserts, said contact surfaces being inclined to form wedge-shaped guides tending to move the respective auxiliary inserts outwardly toward the surface of the circular bore of the container when said principal inserts are urged outwardly.

4. In a metal extrusion press, a container having a circular bore therethrough, and means forming in said circular bore a chamber of predetermined internal area and of substantially elongated cross-sectional contour for receiving a billet of corresponding elongated cross-section, said means comprising opposed inserts positioned in said circular bore and having elongated surfaces for engaging the billet and circumferential surfaces conforming to the surface of the circular bore, said inserts being provided with relatively thin marginal projections adjacent each end of said elongated surfaces projecting towards each other at an angle to said surfaces to form flexible sealing lips for said chamber, whereby, when pressure developed within the chamber forces the inserts outwardly toward said bore, sealing contact will be maintained at the sides of the inserts so that metal of the billet will not be able to extrude laterally out of said chamber into the joint formed by said sealing lips.

5. In a metal extrusion press, a container having a billet-receiving cavity of elongated transverse contour oriented along a major axis and a minor axis so that when pressure is developed in said cavity the wall portions of the container intersected by the major axis are subject to the greatest tensile force while the wall portions intersected by the minor axis are subject to a smaller tensile force, the wall thickness of the container in the region of the minor axis and smaller tensile force being greater than the wall thickness in the region of the major axis where the thickness is dimensioned at least to sustain said greatest tensile force, whereby resistance of the container to deformation is increased in the region of the minor axis to minimize bending stresses in the region of the major axis.

6. In a metal extrusion press, a die having an opening of a contour substantially elongated transversely to the direction of extrusion, a container having a circular bore therethrough, and means forming in said circular bore a chamber of elongated cross-sectional contour having a major axis and a minor axis for receiving a billet of corresponding elongated cross-section, said means comprising a pair of opposite principal inserts and a pair of opposite auxiliary inserts all positioned in said bore, the inside of each of said auxiliary inserts having an approximately V-shaped recess with each outer end of said recess terminating at a bearing surface, each of the bearing surfaces extending outwardly from the recess and terminating at the adjacent end of the bore-contacting surface of the respective auxiliary insert, said auxiliary inserts being positioned in said circular bore intermediate said principal inserts at opposite sides thereof with the walls of the respective auxiliary insert recesses engaging the principal inserts and said bearing surfaces supporting the principal inserts, said principal inserts being permanently spaced in the direction of said minor axis and the auxiliary inserts being permanently spaced in the direction of said major axis, the short sides of said chamber being formed by portions of the central regions on said auxiliary inserts and the long sides of said chamber being formed by billet-engaging surfaces on said principal inserts, each of said billet-engaging surfaces terminating at each end in a marginal projection that forms a sealing lip arranged to press against the adjacent central region on one of said auxiliary inserts.

References Cited in the file of this patent

UNITED STATES PATENTS

| 421,666 | Carpenter | Feb. 18, 1890 |
| 900,401 | Loomis | Oct. 6, 1908 |
| 1,199,080 | Jones | Sept. 26, 1916 |
| 1,836,821 | Singer | Dec. 15, 1931 |
| 2,061,407 | Royle | Nov. 17, 1936 |
| 2,389,876 | Sequin | Nov. 27, 1945 |
| 2,392,336 | Nissen | Jan. 8, 1946 |
| 2,748,934 | Wheeler | June 5, 1956 |

FOREIGN PATENTS

| 376,132 | France | May 3, 1907 |